Feb. 28, 1956 J. C. MILLER 2,736,806

BLOCKING OSCILLATOR

Filed May 12, 1953

*INVENTOR.*
J. C. MILLER
*BY* Roland A. Anderson
*ATTORNEY*

United States Patent Office 2,736,806
Patented Feb. 28, 1956

2,736,806

BLOCKING OSCILLATOR

Jack C. Miller, Albuquerque, N. Mex., assignor to the United States of America as represented by the United States Atomic Energy Commission Application May 12, 1953, Serial No. 354,549

2 Claims. (Cl. 250—36)

This invention relates to an improved blocking oscillator and provides a circuit from which may be obtained a short electrical pulse of higher power and of far greater steepness than is produced by the presently standard blocking oscillator circuit.

Such pulses are widely used in the initiation of cathode ray oscilloscope sweeps, for example, or in instigating the breakdown of a thyratron. In all such cases, it is important to minimize the time interval between the start of the instigating pulse and its attainment of the magnitude required to produce the desired operation of the circuit to which the pulse is applied.

The general object of the invention is thus to provide a circuit producing a voltage pulse, of either polarity, which rises from zero much more rapidly than do pulses derived from the circuits of the prior art.

The circuit provides a pulse of amplitude far greater than does a conventional circuit, and this is another object of the invention.

The present invention makes use of two vacuum tubes so interconnected that mutual amplification of pulses individual to the tubes is brought about, with the result that the circuit of each tube is a source of voltage pulses amplified by the other tube. In this way two independent circuits may be set in operation simultaneously. By introducing a delay line after one of the pulses, the two circuits may be operated successively. Numerous other possible arrangements will occur to those skilled in the art.

A feature of the invention is that repetitive pulses may be obtained from a large number of points in the circuit, many more connections being available in the circuit of the present invention than in the hitherto known organization, and the circuit may be either free running or under control of a series of injected pulses themselves of small amplitude.

Thus another object of the invention is to provide a bilateral blocking oscillator capable of producing voltage pulses of great amplitude and steepness from a plurality of points of connection to a pair of subsequent circuits.

Figure 1:
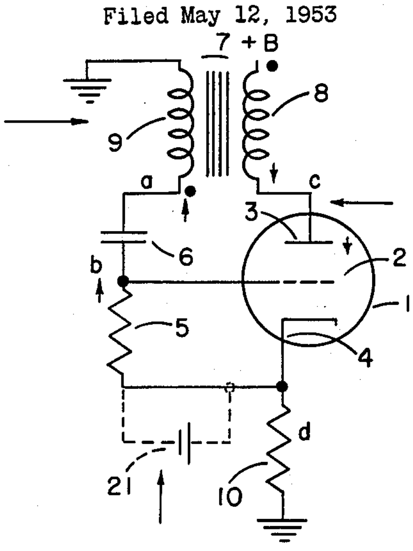
Figure 2:
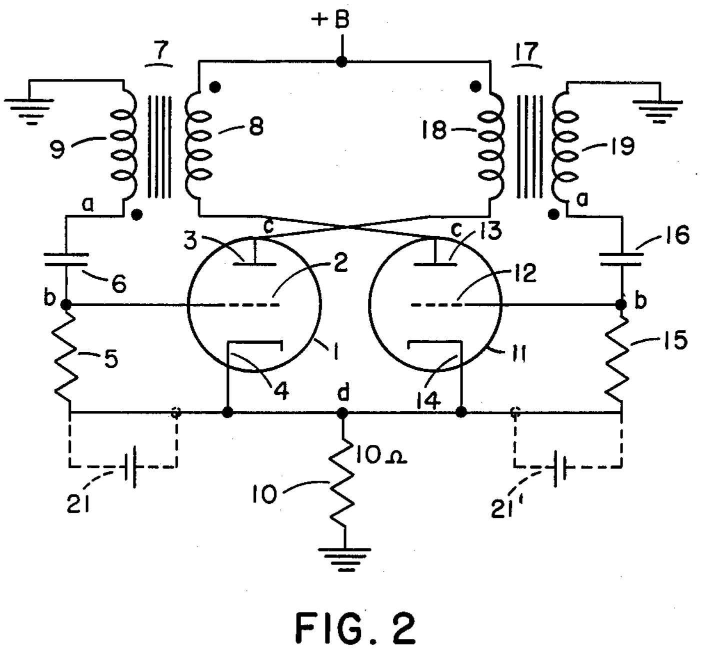

The invention will be clearly understood from the following description of an illustrative embodiment thereof, with reference to the accompanying drawings in which:

Fig. 1 is a diagram of the circuit of the prior art, shown for comparison with that of the present invention; and Fig. 2 is a diagram of the improved circuit, arranged for free-running operation.

Referring now to Fig. 1, numeral 1 designates a vacuum tube provided at least with a control grid 2, an anode 3 and a cathode 4. More complicated tubes may be used as desired. Cathode heating power is understood but not shown. Transformer 7 inductively connects anode 3 and (through 300 mmfd. condenser 6) grid 2. Resistor 5, conveniently of 1 megohm resistance, provides a grid leak between grid 2 and cathode

4. Condenser 6 and resistor 5, of time constant 300 microseconds, provide a differentiating circuit for pulses destined to vary the potential of grid 2. Cathode resistor 10 is of 10 ohms resistance.

Transformer 7 is a blocking oscillator transformer such as the Westinghouse 7P3, of one-to-one ratio. Windings 8 and 9 respectively join the anode voltage supply to anode 3 and ground to grid 2 through condenser 6. The connections of windings 8 and 9 are so made that the phase of a pulse in winding 8 at its connection to the anode voltage source is the same as the phase of the induced pulse in winding 9 at its connection to condenser 6; this is indicated by the black dots adjacent the respective ends of these windings as shown in Fig. 1. It is of course possible so to arrange the windings that the dots should be shown at the same level, but this is avoided in the prior art circuit of Fig. 1.

The free running operation of this conventional oscillator circuit (tube 1 conducting) is as follows, referring to the short arrows shown:

A momentary spontaneous rise in voltage at grid 1 (upward arrow) is accompanied by a like increase in anode current and a corresponding fall in voltage at anode 3. This negative anode voltage pulse in winding 8 (downward arrow) appears reversed in winding 9, and reinforces the original positive pulse at grid 1. As is known, this effect is cumulative and continues until the anode voltage "bottoms" due to the grid current having reached a value equivalent to that of the plate current. At this point the anode current decreases and the grid voltage further falls, cumulatively so, until conduction by the tube stops, to be restored when the charge on condenser 6 sufficiently leaks off through resistor 5.

The operation of the circuit may be changed from free running to be controlled by a synchronizing pulse. For this, there is introduced between cathode 4 and grid 2 a battery (or the equivalent) biasing the grid beyond cutoff at the end of each cycle so that renewed operation requires a synchronizing pulse effective to cancel the negative grid bias and make the tube conductive. In dotted lines, battery 21 is indicated as intervening for this purpose between cathode 4 and the adjacent terminal of resistor 5. In this arrangement, the synchronizing pulse may by known means be introduced at any of a plurality of points in the circuit, examples being pointed to by the long arrows.

Referring now to Fig. 2, the present invention adds to the circuit of Fig. 1, tube 11 and transformer 17 (duplicates respectively of tube 1 and transformer 7) together with cross connections producing a bilateral blocking oscillator in which each tube provides amplification in a positive feed-back path for the other tube. This amplification is effective to steepen the voltage pulses available at points *a*, *b*, *c* and *d* of Fig. 1, producing at the like-lettered points of Fig. 2 greater and faster rising pulses than their respective counterparts in Fig. 1. It may be noted that exact simultaneity of all pulses is here obtained unlike the cascading of two circuits such as in Fig. 1.

The connections in Fig. 2 which bring about this improvement involve cross-connecting anodes 3 and 13 to the adjacent terminals of windings 18 and 8, respectively, the remote terminals of these windings being joined to the source of anode voltage. In Fig. 2 as in Fig. 1, condensers 6 and 16 are each 300 mmfd., resistors 5 and 15 are each 1 megohm, and resistor 10 is 10 ohms. The black dots indicate as before the phase relationship of voltages in the transformer windings.

Batteries 21, 21' may replace the direct connections between cathodes and grid leak resistors to permit control by injected pulses in the same manner as in Fig. 1, and such pulses may be introduced in like positions in the circuit of each tube of Fig. 2 as in that of the single tube of Fig. 1.

The operation of the improved circuit is as follows, in free running:

A momentary rise in voltage at the grid of tube 1 increases the anode current in that tube with an accompanying drop in anode voltage. This voltage drop then appears (because of the opposite phases in the windings of transformer 18) as a rise in voltage at the grid of tube 11. The conductance of tube 11 rises, its anode voltage falls and this fall is through transformer 7 applied as a rise to the grid of tube 1. The action is like that in the conventional circuit of Fig. 1, except that the reinforcing pulse finally applied to grid 2 has been amplified in tube 11. Whereas the prior art circuit of Fig. 1 involves positive feed-back, the circuit of the present invention includes amplification in the feed-back path.

Illustratively, in the circuit of Fig. 2, tubes 1 and 11 may be each one-half of a 5687, resistors 5 and 15 are each 1 megohm and condensers 6 and 16 each 300 micromicrofarads. These values correspond to a nominal oscillation frequency of 1000 C. P. S. The anode voltage is suitably 300 volts, and for the triggered case a negative bias of 25 volts is used for batteries 21, 21'. The interconnection of the tubes may be between condensers 6 and 16 as well as between the anodes of tubes 1 and 11; in this revision of the circuit the windings of each transformer exchange connections. The transformer voltage ratios (windings 8 to 9 and 18 to 19) may be in each case, say two to one, or unity, the windings of greater number of turns being cross-connected between the anodes as illustrated or between the condensers in the described revision.

I claim:

1. A blocking oscillator circuit comprising a first and second blocking oscillator, each including a vacuum tube provided with an anode, a control grid and a cathode, power supply for said oscillators, a first and a second transformer having each a primary and a secondary winding, one terminal of each primary winding being connected to the power supply while the other primary terminal of the first transformer is connected to the anode of the tube of the second oscillator and the other primary terminal of the second transformer is connected to the anode of the tube of the first oscillator, the secondary winding of the first transformer being connected in series with a first condenser between ground and the grid of the tube of the first oscillator, and the secondary winding of the second transformer being connected in series with a second condenser between ground and the grid of the tube of the second oscillator, the cathodes of both tubes being connected together and through a common resistance to ground and through individual resistors to the respective grids.

2. A blocking oscillator circuit as in the claim 1 including grid biasing batteries individually in series with the grid-to-cathode resistors.

References Cited in the file of this patent

UNITED STATES PATENTS

| | | |
|---|---|---|
| 1,507,016 | De Forest | Sept. 2, 1924 |
| 2,509,792 | Westcott | May 30, 1950 |
| 2,605,404 | Valley, Jr. | July 29, 1952 |

FOREIGN PATENTS

| | | |
|---|---|---|
| 510,531 | Great Britain | Aug. 2, 1939 |